US009630035B2

(12) United States Patent
Muehlstein et al.

(10) Patent No.: US 9,630,035 B2
(45) Date of Patent: Apr. 25, 2017

(54) TRANSPORT DEVICE AND TRANSPORT METHOD FOR A CONTAINER TREATMENT INSTALLATION

(71) Applicant: KRONES AG, Neutraubling (DE)

(72) Inventors: Peter Muehlstein, Koefering (DE); Johann Huettner, Mallersdorf-Pfaffenberg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/123,918

(22) PCT Filed: Jan. 13, 2015

(86) PCT No.: PCT/EP2015/050501
§ 371 (c)(1),
(2) Date: Sep. 6, 2016

(87) PCT Pub. No.: WO2015/139851
PCT Pub. Date: Sep. 24, 2015

(65) Prior Publication Data
US 2017/0014654 A1    Jan. 19, 2017

(30) Foreign Application Priority Data

Mar. 21, 2014  (DE) .................. 10 2014 103 900

(51) Int. Cl.
*A62C 2/22*      (2006.01)
*B65G 21/12*     (2006.01)
*B65G 21/20*     (2006.01)

(52) U.S. Cl.
CPC ............. *A62C 2/22* (2013.01); *B65G 21/12* (2013.01); *B65G 21/2072* (2013.01); *B65G 2201/0235* (2013.01); *B65G 2207/22* (2013.01)

(58) Field of Classification Search
CPC ............ B65G 21/12; B65G 21/14; A62C 2/22
USPC ........................................................ 198/603
See application file for complete search history.

(56) References Cited

U.S. PATENT DOCUMENTS

| | | | | |
|---|---|---|---|---|
| 4,753,337 A | * | 6/1988 | Grosjean | A62C 2/22 198/583 |
| 5,392,900 A | * | 2/1995 | Sandwall | B63B 27/22 114/73 |
| 5,944,169 A | * | 8/1999 | Allen | B65G 13/10 186/59 |
| 6,409,011 B1 | * | 6/2002 | Ferguson | B65G 15/00 186/68 |

(Continued)

FOREIGN PATENT DOCUMENTS

| | | |
|---|---|---|
| DE | 2348854 | 4/1975 |
| DE | 2352044 | 4/1975 |
| DE | 2647243 | 4/1978 |

(Continued)

*Primary Examiner* — Thomas Randazzo
(74) *Attorney, Agent, or Firm* — Walter | Haverfield LLP; D. Peter Hochberg; Sean F. Mellino

(57) ABSTRACT

A transport device and a transport method is provided for a container treatment plant. The transport device comprises at least one transporter for transporting containers to or away from a treatment station of the container treatment plant, wherein at least one transporter is positioned displaceable in relation to another one of the transporters to provide a closeable spatial separation between the at least one displaceable transporter and the other transporter.

10 Claims, 3 Drawing Sheets

(56) References Cited

U.S. PATENT DOCUMENTS 7,770,720 B2 * 8/2010 Freudelsperger ........ B65G 1/00
198/583

FOREIGN PATENT DOCUMENTS

| DE | 4124822 | 1/1993 |
|----|---------|--------|
| DE | 9319326 | 2/1994 |
| JP | S5262874 | 5/1977 |
| JP | H0213015 | 5/1990 |

* cited by examiner

TRANSPORT DEVICE AND TRANSPORT METHOD FOR A CONTAINER TREATMENT INSTALLATION

CROSS REFERENCE TO RELATED APPLICATIONS

This application is a 371 National Stage application of International Application No. PCT/EP2015/050501, filed on Jan. 13, 2015, which claims foreign priority to German (DE) Application Serial No. 10 2014 103 900.9 filed on Mar. 21, 2014, the contents of which are incorporated herein by reference in its entireties.

BACKGROUND OF THE INVENTION

Field of the Invention

The present invention relates to a transport device and a transport method for a container treatment plant.

Description of the Prior Art

A container treatment plant which can comprise, for example, a blow moulding machine, a cleaning machine, a filling machine, a labeling machine, a packaging machine, etc. is employed, for example, in the beverage industry for production and/or filling and/or packaging of containers. Containers are in particular cans, glass bottles or plastic bottles. The containers are transported by a transport device to a container treatment plant and away from the container treatment plant.

It is necessary in some container treatment plants to mount plant parts in different rooms. This can be the case, for example, if a closure between the rooms has to be present because of reasons regarding the static state or fire protection. In such a case, the containers are to be transported from room to room so that the transport device is to be conducted through an opening in the separation of the rooms. However, as needed, there should also be possible a separation of the rooms at the transport device because of, for example, reasons regarding fire protection. In this case, the corresponding provisions of fire protection have to be met, too. Usually, there has to be provided a fire protection door or a fire protection flap, which is closed in the case of fire.

To solve this problem, tiltable/expandable transporters were developed which are guided through the opening in a wall during normal operation and are tilted for closing the fire protection door or fire protection flap. Such tiltable/expandable transporters are employed according to a solution performed with a roller transition between two adjoining transporters which are provided for transporting the containers from the one room into the other room. However, transporters comprising a roller transition are inappropriate for the transport of most of the containers. A further problem lies in that the containers stop on the transition between the transporters and, due to this, fall into the range of a fire protection door when tilting the transporter. This leads, thus, possibly to jams in the fire protection door so that the fire protection door cannot be closed.

According to another solution, the tiltable/expandable transporters are implemented with driven chain. In such tiltable transporters, a clearing control is necessary and the conveying plant is very cost-intensive because of the separate drive.

SUMMARY OF THE PRESENT INVENTION

Therefore it is the object of the present invention to create an ameliorated transport device and an ameliorated transport method for a container treatment plant, which solve the above-mentioned problems and enable in particular a transport of containers securely, inexpensive and simple even through a fire protection wall.

This object is solved by a transport device for a container treatment plant according to the presently claimed invention. The transport device has at least one transporter for transporting containers to or away from a treatment station of the container treatment plant, wherein at least one transporter is positioned displaceable in relation to another one of the transporters to provide a closeable spatial separation between the at least one displaceable transporter and the other transporter.

With the described transport device, the necessary closeable opening hors fire protection door can be created securely, inexpensive and simple because of the implementation of one transporter as a displaceable or moveable transporter.

A further advantage lies in that no clearing control is required for the transport device, since the containers present on the transporters of the transport device are displaced together with the displaceable transporter out of the opening in a wall. No objects transported by the transport device can fall into the range of a fire protection door. Therewith, there is no danger of jamming at the fire protection door.

It is a further advantage that, in the mentioned construction of the transport device, no bottles remain on the displaceable transporter during the production, since there is no knife edge transition. Due to this, there is also no additional driving device required for clearing. Further, the danger of plant downtimes caused by error conditions due to stopping of the containers on the transporter is minimized.

Advantageous further developments of the transport device are given in the dependent claims.

The displaceable transporter can be positioned as adjoining side by side to at least one other transporter of the at least one transporter, and/or the displaceable transporter can be positioned in the normal operation state transverse to the transport direction of the containers at another transporter of the at least one transporter.

Possibly the at least one transporter is a chain transporter, and/or a chain transition without space in-between can be implemented in the range of an oblique over thrust of containers from the displaceable transporter to the other of the at least one transporter or vice-versa, and/or at least one of the at least one transporter can comprise a railing which is changeable by displacing the at least one transporter. Therewith, the over thrust of the containers can be performed as failure-free as possible.

It is advantageous, if the transport device further comprises a locking unit and/or displacing unit for locking the displaceable transporter during normal operation state and/or for displacing the displaceable transporter in relation to the other transporter when an operation for displacing the displaceable transporter is present, and/or the displaceable transporter can comprise a rail guide for displacing the displaceable transporter. With the rail guide, the displaceable transporter can be displaced simply repeatable at fixedly determined positions.

According to one implementation version, the locking unit and/or displacing unit comprises a pneumatic cylinder which is exposed in normal operation state to pressurized air for locking the displaceable transporter at its position in the normal operation state, and which is not exposed to pressurized air in an operation state for displacing the displaceable transporter. Therewith, it can be achieved that the transport device goes over automatically into a secure operation state in the case of fire.

According to a further implementation version, the locking unit and/or displacing unit comprises a retaining spring for retaining the displaceable transporter at its position in normal operation state and for displacing the displaceable transporter in the operation state for displacing the displaceable transporter. Also therewith, it can be achieved that the transport device goes over automatically into a secure operation state in the case of fire.

The locking unit and/or displacing unit can be formed such that it are/is drivable by a detecting device for detecting the operation for displacing the transporter.

The above-described transport device can be part of a container treatment plant which further comprises at least one treatment station for treating containers, wherein the transport device serves for transporting containers to the at least one treatment station or away from the at least one treatment station.

The container treatment plant can be or comprise a blow moulding machine or a cleaning machine or a filling machine or a labeling machine.

The above-described object is further solved by a transport method for a container treatment plant according to the presently claimed invention. The transport method comprises the steps of: transporting, by at least one transporter, containers to or away from a treatment station of the container treatment plant, detecting an operation state for displacing at least one displaceable transporter of the at least one transporter, and displacing the displaceable transporter in relation to one other transporter of the at least one transporter, to realize a closeable spatial separation between the at least one displaceable transporter and the other transporter.

The transport method achieves the same advantages as they are mentioned above as regards the transport device.

Further possible implementations of the invention comprise also combinations or features or styles described above or in the following with reference to the embodiments, even if they are not explicitly mentioned. Herein, the person skilled in the art will also add single aspects as improvements or additions to the respective basic form of the invention.

Further implementations of the invention are subject matter of the embodiments of the invention described in the following.

DESCRIPTION OF THE DRAWINGS

In the following, the invention is described in more detail by means of embodiments and with reference to the appended drawing figures, wherein.

In the drawing figures, the same or functionally same elements are provided with the same reference signs unless given otherwise.

DETAILED DESCRIPTION OF THE PRESENT INVENTION

Figure 1:
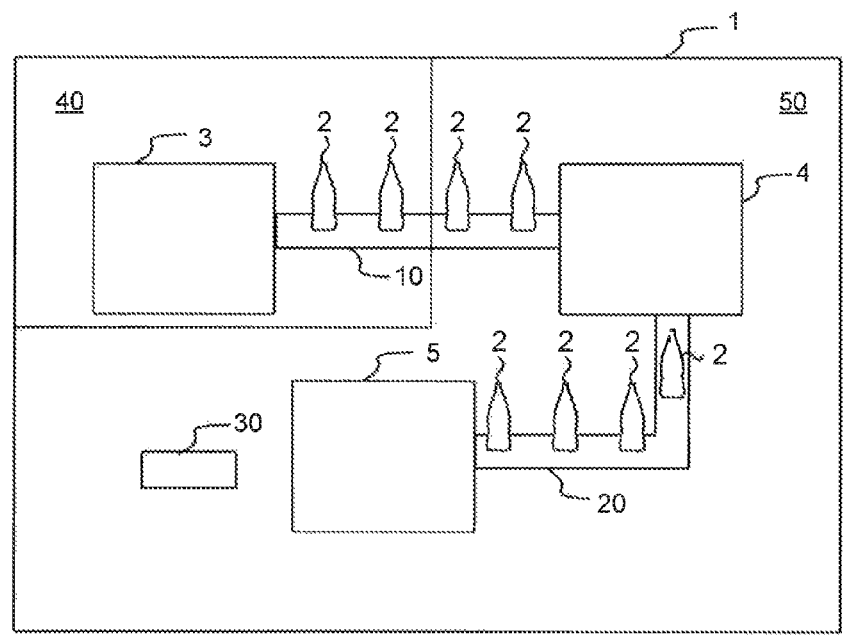
FIG. 1 shows a schematic bloc diagram of a container treatment plant comprising a transport device according to a first embodiment.

FIG. 1 shows very schematically a container treatment plant 1 for treating containers 2. The containers 2 can either be finished containers, like glass or plastic bottles, cans, etc. or also preforms. In the container treatment plant 1 in FIG. 1, the containers 2 can be produced out of the preforms. The preforms are manufactured from plastic, like polyethyleneterephthalate (PET), polypropylene (PP), etc. and are likewise containers even if still unfinished containers or containers not treated by the container treatment plant 1. The finished containers 2 are in FIG. 1 as an example bottles into which a product can be filled. A product can be in particular a beverage, a detergent, etc.

In FIG. 1, the container treatment plant 1 includes a first treatment station 3, a second treatment station 4 and a third treatment station 5 as well as a first transport device 10, a second transport device 20 and a control device 30. The first treatment station 3 can be, for example, a filling machine for filling the containers 2 with the product. The second treatment station 4 can be, for example, a labeling machine for labeling the filled containers 2. The third treatment station 5 can be, for example, a packaging machine for packaging the containers 2 in particularly bundles comprising a determined number of containers 2, for example, six containers 2. The first and second transport devices 20 transport the containers 2 between the individual treatment stations 3, 4, 5 and a first and second room 40, 50, as shown in FIG. 1. The control device 30 controls the first to third treatment stations 3, 4, 5 as well as the first and second transport devices 10, 20.

Figure 2:
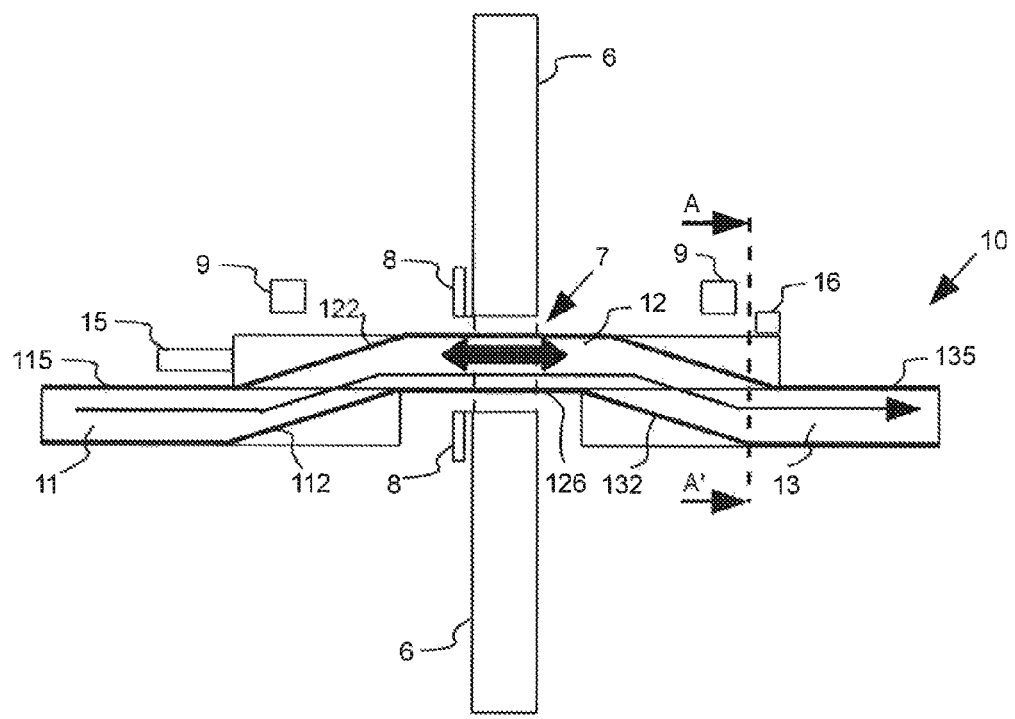
FIG. 2 shows a schematic top view onto the transport device according to a first embodiment in normal operation state.
Figure 3:
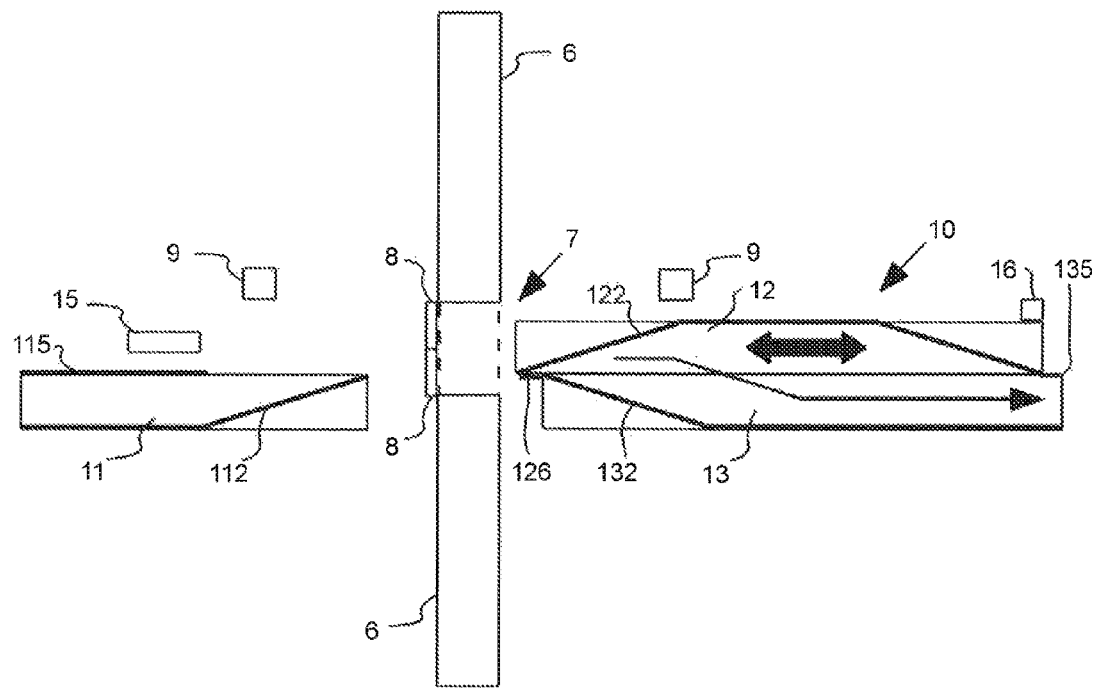
FIG. 3 shows a schematic top view onto the transport device according to a first embodiment in an operation state suitable for the case of fire.

FIG. 2 depicts schematically in more detail the first transport device 10 at its mounting location at a wall 6 which is in particular a fire protection wall. The wall 6 has an opening 7 which is closeable by a door 8. The door 8 in FIG. 2 is a two-wing door. The door 8 can be in particular a fire protection door or a fire protection flap or any other closing device for closing the opening 7. At both sides of the door 8 is mounted a detection device 9, respectively, which can be a fire detector, for example. The first transport device 10 has a first transporter 11 comprising railings 112, 115, a second transporter 12 comprising railings 122, 126, a third transporter 13 comprising railings 132, 135, a locking unit 15 and a displacing unit 16. The latter are named in the following locking and/or displacing unit 15, 16, too. The first and third transporters 11, 13 are fixedly mounted transporters. In contrast thereto, the second transporter 12 is displaceable if necessary in or at least partly through the opening 7 in the directions of a black bold arrow in FIG. 2 or FIG. 3, so that the second transporter 12 is positioned as shown in FIG. 2, or is displaceable out of the opening 7 so that the second transporter is positioned as shown in FIG. 3.

A railing 112 is mounted to the first transporter 11 such that the railing 112 remains fixed in relation to the second transporter 12 when displacing the second transporter 12. The railing 112 is fix in its shape. In contrast thereto, the railing 115 is changeable, in particular prolongable or shortable, as evident from FIG. 2 and FIG. 3. This can be effected, for example, like a telescope, an accordion, etc. The railings 122, 126 are mounted to the second transporter 12 such that the railings 122, 126 are displaced together with the second transporter 12. Herein, the railing 122 is fix in its shape, whereas the further railing 126 is changeable, in particular prolongable or shortable, as also evident from FIG. 2 and FIG. 3. Also the change of the further railing 126 can be effected, for example, like a telescope, an accordion, etc. Alternatively or additionally, also the center piece of the railing 122, which is positioned in the displacing direction of the second transporter, can be changeable, in particular prolongable or shortable. The railing 132 is mounted to the third transporter 13 such that the railing 132 remains fix relative to the second transporter 12 when displacing the second transporter 12. Therewith, also the railing 132 is fix in its shape. In contrast thereto, the railing 135 is changeable, in particular prolongable or shortable, as also evident from FIG. 2 and FIG. 3. Also this can be effected, for example, like a telescope, an accordion, etc. However, in case also the center piece of the railing 122 is changeable, in particular prolongable or shortable, the railing 135 does not need to be changeable if applicable.

Thus, the railing 126 and/or the railing 135 and/or the railing 122 are/is changeable or displaceable. Displacing the railings 122, 126, 135 is herein coupled to displacing the second transporter 12. Therewith, the railings 126, 135 and, if applicable, the railing 122 can be changed by displacing the second transporter 12.

The second transporter 12 is, thus, a moveable or displaceable transporter 12. This moveable or displaceable transporter 12 is locked and hold in a closed position by the locking unit 15 which can be a pneumatic cylinder. In case of a power failure, the displaceable or moveable transporter 12 can be retracted by means of the displacing unit 16 to achieve the gap required for closing the door 8. With the door 8, a closeable spatial separation between the transporter 11 and the transporters 12, 13 can be achieved. The release of the locking unit 15 can also be effected not only by a power failure or shut-off but also by a signal from the control device 50 and/or at least one of the detecting devices 9, so that the displacing device 16 for displacing the second transporter can be activated. Herein, the detecting device 9 can be configured to detect the operation for displacing the second transporter 12. In case the detecting device 9 is, for example, a fire detection system or a fire detector, the case of fire is detected in which there is an unexpected high smoke and/or heat development in at least one of the rooms 40, 50 or in the subordinate building. The fire detector can also be connected to the fire detection system.

As evident from FIG. 2 and FIG. 3, the second transporter 12 is positioned both side by side to the first transporter 11 and side by side to the third transporter 13. Herein, the first and second transporters 11, 12 adjoin each other and the second and third transporters 12, 13 adjoin each other. In FIG. 3, only the second and third transporters 12, 13 adjoin each other. The containers 2 are transported in the direction of the serrated arrow on the transporters 11, 12, 13. The exact mounting position of the locking and/or displacing unit 15, 16 is freely selectable depending on the implementation thereof and the implementation of the transport device 10.

Figure 4:
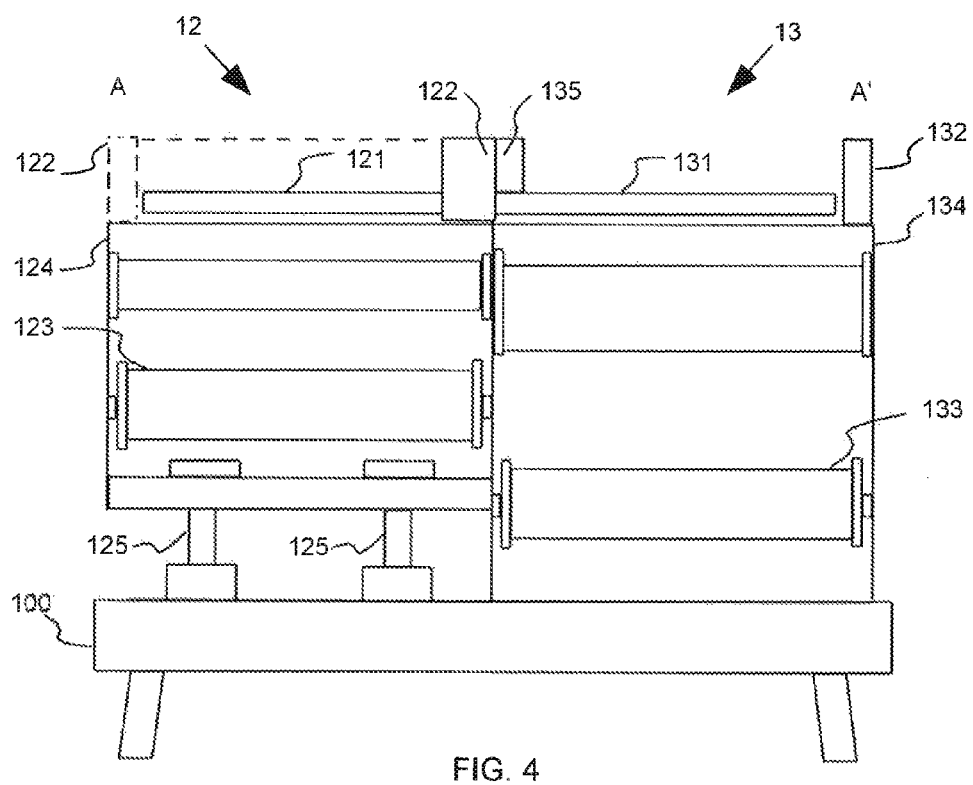
FIG. 4 shows a schematic cross section of a transport device according to a first embodiment.

FIG. 4 shows schematically in a simplified depiction and in more detail the structure of the transport device 10 regarding a section A-A' of FIG. 2. As for the transport device 10, the second transporter 12 has a transport belt 121, the railing 122, a deflection roller 123 for the endless transport belt 121, a base frame 124, as well as rail guides 125 which are mounted to a platform 100 of the transport device 10. The further railing 126 is not visible in a sectional view of FIG. 4. The second transporter 12 can, thus, be displaced back and forth on the base frame 100 and guided by the rail guides 125 into or out of the drawing plane of FIG. 4. The transport belt 121 can be formed as chain transport belt.

The third transporter 13 has, as shown in FIG. 4, in addition a transport belt 131, the railing 132, a deflection roller 133 for the endless transport belt 131, a base frame 134, as well as the further railing 135. The further railing 135 is connected obliquely as regards the transport direction of the containers 2 to the railing 122 of the second transporter 12. Therewith, the railing 135 can realize together with the railing 122 of the second transporter 12 an oblique over thrust of the containers 2 from the second transporter 12 to the third transporter 13. A third transporter 13 is fixedly mounted with its base frame 134 to the platform 100. Thus, the third transporter 13 is not displaceable as regards the platform 100. Since the platform 100 is also fixedly mounted to the floor of the room 50, the third transporter 13 is also fixedly or indisplaceably mounted in the room 50. The transport belt 131 can be formed as a chain transport belt, as well.

At least in the moveable range of the oblique over thrust of the containers 2 from one to the other adjoining transporters 11, 12 or 12, 13, the transition at the transport belts 121, 131 of the both adjoining transporters 11, 12 or 12, 13 is implemented without gap. Thus, the both adjoining transporters 11, 12 or 12, 13 are mounted flush what is also named as true flush mount. In the implementation shown in FIG. 2 to FIG. 4, the moveable range of the oblique over thrust of the containers 2 from one to the other adjoining transporter 11, 12 or 12, 13 corresponds to the length of the second transporter 12.

The first transporter 11 is implemented analogously to the third transporter 13.

Thus, a moveable or displaceable transporter 12 is used in the present embodiment at the door 8 with separated transport technology or conveying technology. To achieve the necessary space for closing the opening 7 by the door 8, if an operation for displacing the transporter 12 is present, a transporter 12 mounted horizontally on rails is used. This moveable or displaceable transporter 12 is locked and held by the locking unit 15 in closed position and is released, when necessary, and retracted by the displacing unit 16 to achieve the gap required for closing the door 8. Consequently, the displacement is effected automatically. Herein, the control device 13 can be used additionally or alternatively to the at least one detecting device 9.

Figure 5:
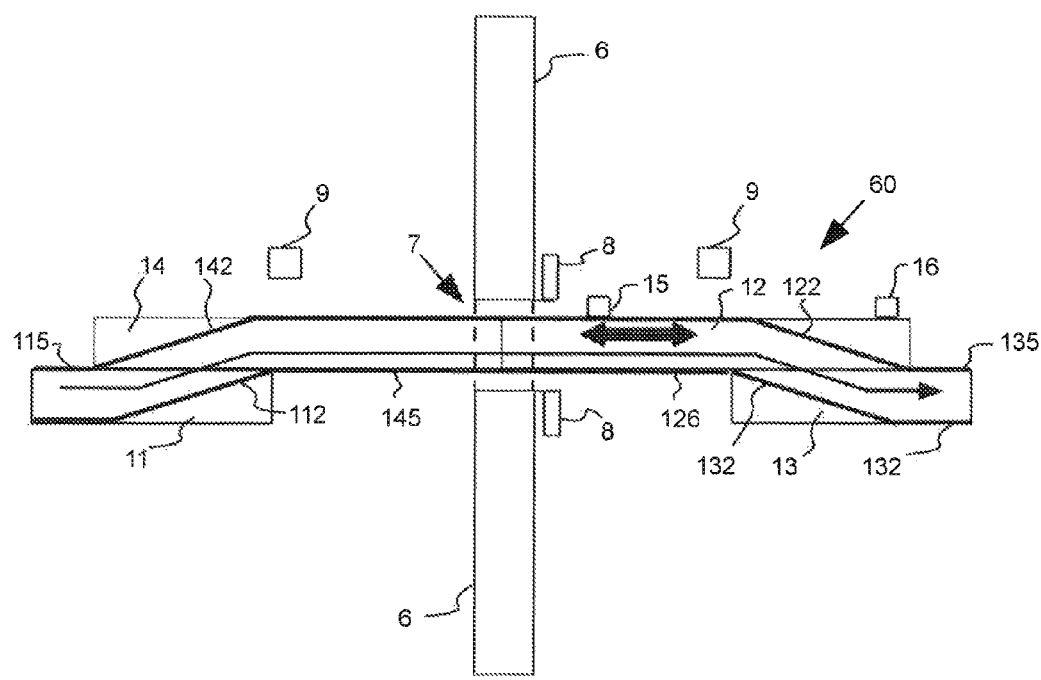
FIG. 5 shows a schematic top view onto a transport device according to a second embodiment in a normal operation state.

According to a modification of the present embodiment, the locking unit can comprise, additionally or alternatively to the pneumatic cylinder, also a retaining spring for retaining or holding the displaceable transporter at its position in normal operation state according to FIG. 2 or FIG. 5. In an operation for displacing the displaceable transporter 12, in particular in the case of fire, the retaining spring serves instead for displacing the displaceable transporter 12 in the position shown in FIG. 3 or FIG. 6. The retaining spring forms, thus, a locking and displacing unit 15, 16.

FIG. 5 shows a transport device 60 according to a second embodiment. The transport device 60 according to a second embodiment is implemented in most parts as the transport device 10 according to the first embodiment. Therefore, only the differences between the both embodiments are described in the following.

In contrast to the first embodiment, the transport device 60 comprises in this embodiment instead of only one displaceable transporter 12 positioned side by side to the first and third transporters 11, 13 still a fourth transporter 14 comprising railings 142, 145. The fourth transporter 14 is also fixedly mounted, as the first and third transporters 11, 13, and can also be implemented analogously to the first and third transporters 11, 13. In the present embodiment, the railings 112, 115 of the first transporter and the railings 142, 145 of the second transporter can however be unchangeable. The fourth transporter 14 is positioned side by side to the first transporter 11. Further, the fourth transporter 14 is positioned such that it is positioned in a butt joint to the second transporter 12, when the second transporter 12 was displaced into the opening 7 and locked and hold by the locking unit 15. Thus, the second transporter 12 forms a direct prolongation of the fourth transporter 14 in the embodiment shown in FIG. 5. Thus, in the normal operation state, the displaceable transporter 12 is positioned transverse to the transport direction of the containers 2 at the fourth transporter 14.

Figure 6:
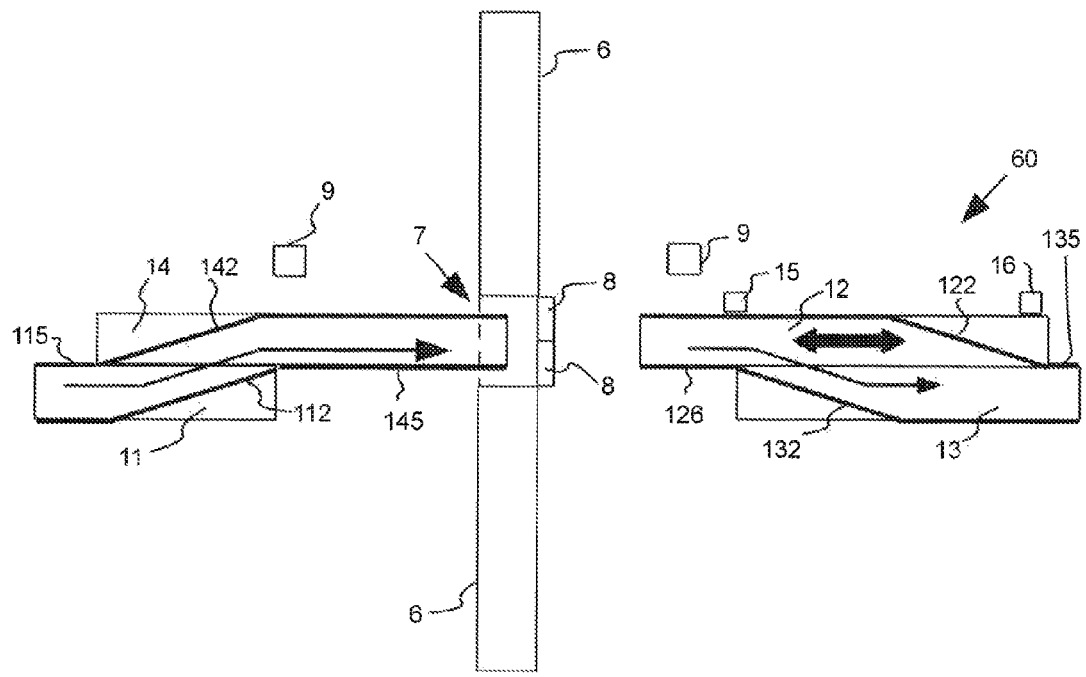
FIG. 6 shows a schematic top view onto the transport device according to the second embodiment in an operation state suitable for the case of fire.

FIG. 6 shows the case when the second transporter 12 is pulled out of the opening 7 so that the door 8 can be closed. Also in the present embodiment, the second transporter 12 can be pulled out of the opening 7 with the aid of a displacing unit 16, as described in the first embodiment. When the door 8 is opened again, the second transporter 12 can be pushed again in the direction of the white bold arrow into the opening 7 and therewith at the fourth transporter 14. In displacing the second transporter 12, the railing 126 and/or 122 and/or 135 change as described in the first embodiment.

The second and third transporters 12, 13 are again constructed as shown in FIG. 4 in a cross section. Thus, also in the present embodiment, the transition at the transport belts 121, 131 of the both adjoining transporters 12, 13 is implemented without gap in at least the moveable range of the oblique over thrust of the containers 2 from one to the other adjoining transporters 12, 13. In the implementation shown in FIG. 5 and FIG. 6, the moveable range of the oblique over thrust of the containers 2 from one to the other adjoining transporters 11, 13 corresponds to the length of the third transporter 12.

In a modification of the present embodiment, no first transporter 11 is present.

All of the above-described implementations of the container treatment plant 1, the transport devices 10, 20, 60 and the above-described transport method can be used separately or in all possible combinations thereof. The features of the first and second embodiments and/or their modifications can be combined arbitrarily. Moreover, in particular, the following modifications are conceivable.

The elements shown in the figures are depicted schematically and can differ in the specific implementations from the forms shown in the figures provided that the above-described functions are ensured. The transport direction of the containers 2 is further shown only as an example and can also be vice-versa.

The container treatment plant 1 of the first or second embodiments can also be used for glass bottles. Further, the container treatment plant 1 can have positioned directly in a row one after another a blow moulding machine, a cleaning machine, a filling machine, a labeling machine, etc., so that the containers 2 can be transported from the preceding machine to the following machine by one of the described transport devices 10, 20 or 60, 20, respectively.

It is possible that the first transporter 11 has another dimension than the second transporter 12 and/or the third transporter 13 and/or the fourth transporter 14.

The door 8 can also be a one-wing door or a sliding door. The door 8 does not have to be opened to the side of the door 8 but can also be a door tiltable to above or underneath the transport device 10, 60.

At least one of the transporters 11 to 14 can be driven by a driving unit. Additionally or alternatively, at least one of the transporters 11 to 14 can be a gravity conveyer.

The invention claimed is:

1. A transport device for a container treatment plant, the transport device comprising:
   at least one transporter for transporting containers to or away from a treatment station of the container treatment plant,
   wherein at least one transporter is positioned displaceable in relation to another one of the transporters to provide a closeable spatial separation between the at least one displaceable transporter and the other transporter.

2. The transport device according to claim 1,
   wherein the displaceable transporter is positioned as adjoining side by side to at least one other transporter of the at least one transporter, and/or
   wherein the displaceable transporter is positioned in the normal operation state transverse to the transport direction of the containers at another transporter of the at least one transporter.

3. The transport device according to claim 1,
   wherein the at least one transporter is a chain transporter, and/or
   wherein a chain transition without space in-between is implemented in the range of an oblique over thrust of containers from the displaceable transporter to another one of the at least one transporter or vice-versa, and/or
   wherein at least one of the at least one transporter comprises a railing which is changeable by displacing the at least one transporter.

4. The transport device according to claim 1,
   further comprising a locking unit and/or displacing unit for locking the displaceable transporter during normal operation state and/or for displacing the displaceable transporter in relation to the other transporter when an operation for displacing the displaceable transporter is present, and/or
   wherein the displaceable transporter comprises a rail guide for displacing the displaceable transporter.

5. The transport device according to claim 4, wherein the locking unit and/or displacing unit comprises a pneumatic cylinder which is exposed in normal operation state to pressurized air for locking the displaceable transporter at its position in the normal operation state, and which is not exposed to pressurized air in an operation state for displacing the displaceable transporter.

6. The transport device according to claim 4, wherein the locking unit and/or displacing unit comprises a retaining spring for retaining the displaceable transporter at its position in normal operation state and for displacing the displaceable transporter in the operation state for displacing the displaceable transporter.

7. The transport device according to claim 4, wherein the locking unit and/or displacing unit are/is configured such that they are/it is drivable by a detecting device for detecting the operation for displacing the transporter.

8. A container treatment plant, comprising
   at least one treatment station for treating containers, and
   a transport device for transporting containers to the at least one treatment station or away from the at least one treatment station, the transport device comprising:

at least one transporter for transporting containers to or away from a treatment station of the container treatment plant, wherein at least one transporter is positioned displaceable in relation to another one of the transporters to provide a closeable spatial separation between the at least one displaceable transporter and the other transporter.

9. The container treatment plant according to claim 8, wherein the container treatment plant is or comprises a blow moulding machine or a cleaning machine or a filling machine or a labeling machine.

10. A transport method for a container treatment plant, comprising the steps of:

transporting, by at least one transporter, containers to or away from a treatment station of the container treatment plant, detecting an operation state for displacing at least one displaceable transporter of the at least one transporter, and displacing the displaceable transporter in relation to one other transporter of the at least one transporter, to realize a closeable spatial separation between the at least one displaceable transporter and the other transporter.

* * * * *